United States Patent
Tsuge

[11] Patent Number: 5,662,369
[45] Date of Patent: Sep. 2, 1997

[54] DEVICE FOR COLLAPSING A BACKREST OF A BACKSEAT OF A CAR

[75] Inventor: Yoshikatsu Tsuge, Nagoya, Japan

[73] Assignee: Chuouhatsujou Kabushiki Kaisha, Nagoya, Japan

[21] Appl. No.: 494,112

[22] Filed: Jun. 23, 1995

[30] Foreign Application Priority Data

Jul. 8, 1994 [JP] Japan ................................ 6-180700

[51] Int. Cl.[6] .................................................. B60N 2/20
[52] U.S. Cl. .................. 296/66; 296/69; 297/378.13; 272/225; 272/DIG. 25; 74/480 R
[58] Field of Search .............................. 296/65.1, 68, 66, 296/69; 297/378.12, 378.13, 378.14; 292/210, 225, DIG. 25; 74/480 R

[56] References Cited

U.S. PATENT DOCUMENTS

| | | | |
|---|---|---|---|
| 3,822,914 | 7/1974 | Iida | 297/378.12 X |
| 4,366,978 | 1/1983 | Hamatani | 296/68 |
| 4,633,724 | 1/1987 | Mochida | 74/471 R |
| 4,711,493 | 12/1987 | Schrom et al. | 297/378.13 |
| 4,721,338 | 1/1988 | Kondo | 297/378.13 |
| 5,054,826 | 10/1991 | Dow et al. | 292/225 X |
| 5,535,608 | 7/1996 | Brin | 292/DIG. 25 X |

FOREIGN PATENT DOCUMENTS 2046730  2/1987  Japan ........................... 297/378.13

Primary Examiner—Dennis H. Pedder
Attorney, Agent, or Firm—Emmanuel J. Lobato; Burns & Lobato, P.C.

[57] ABSTRACT

A device for collapsing a backrest of a backseat of a car for placing in communication a rear trunk with the passenger compartment of the car. The backrest is biased from an upright position to a collapsed position forwardly by a coiled biasing spring. A latch rod fixed to the backrest is received and held by a releasable latch of a backseat lock so that the backrest is releasably held in an upright position against the biasing force of the biasing spring. The lock is connected to a control cable operable manually from the vicinity of the front seat of the car or from the vicinity of the rear trunk to render the latch holding action ineffective and release the latch rod. The biasing spring will then collapse the backrest forwardly. The backrest is restored manually to an upright position and locked in readiness for collapsing by the biasing spring. The control cable has a flexible outer casing and an inner cable slidable longitudinally therein.

2 Claims, 6 Drawing Sheets

5,662,369

DEVICE FOR COLLAPSING A BACKREST OF A BACKSEAT OF A CAR

BACKGROUND OF THE INVENTION

1. Field of the Invention

The present invention relates generally to a device for collapsing a back rest of car's back seat used in a so-called trunk-through-opener adapted to collapse the back rest of the back seat forward and thereby to place the rear seat in communication with a trunk space.

2. Description of the Prior Art

To collapse the rear seat forward, the trunk-through-opener of the prior art usually relies upon the lock button provided on the back seat and therefore it is required for a user to stretch his or her hand from the front seat or to open the rear door in order to operate the lock button. This is a disadvantage encountered and left behind by the prior art unsolved.

SUMMARY OF THE INVENTION

The problem as has been mentioned above is solved, according to a first aspect of the invention, by providing an improved device for collapsing a back rest of a car's back seat, said device comprising biasing means to bias the back rest of the back seat to be collapsed forward or rearward, lock means to hold the back rest in its erected position, and front seat side release means provided in the proximity of a front seat and adapted to release the back rest from a holding effect of the lock means and/or trunk side release means provided in the proximity of a trunk space, wherein the front seat side release means, the trunk side release means and the lock means are connected one to another by a control cable comprising a flexible outer casing and an inner cable slidably inserted thereinto. The problem is also solved, according to a second aspect of the invention, by providing the improved device recited in the above-mentioned first invention, wherein said lock means comprises a holding lever having a holding notch adapted to receive a latch rod fixed to the back rest and being pivotally movable between a position at which said holding lever holds said latch rod and a position at which said holding lever releases said latch rod off from its held position, a latch lever being pivotally movable between a position at which said latch lever is engaged with said holding lever to latch the latter in its holding position and a position at which said latch lever is disengaged from said holding lever, and a link causing said latch lever to be pivotably moved, and wherein an end of the outer casing is fixed to a car body and an end of the inner cable is connected to one end of the link.

The first invention conveniently allows a holding effect of the lock means upon the back rest of the back seat to be released by operating the front seat side release means or the trunk side release means. Accordingly, the back rest of the back seat can be easily collapsed by operating the trunk opener means or the front seat side release means with the hand of a person sitting on the front seat or by using a key to open the lid of the trunk and thereafter by operating the trunk side release means when said person stands behind the car. According to the second invention, the inner cable of the control cable may be pulled by operating the front seat side release means or the trunk side release means to actuate the link and thereby to disengage the latch lever from the holding lever, whereupon the latch rod is released off from the holding notch of the holding lever and the back rest of the back seat is collapsed under the effect of the biasing means. In this the second invention assures that the first invention is reliably executed.

DESCRIPTION OF THE PREFERRED EMBODIMENT

Reference will now be made in detail to the present preferred embodiment of the invention, examples of which are illustrated in the accompanying drawings.

Figure 1:
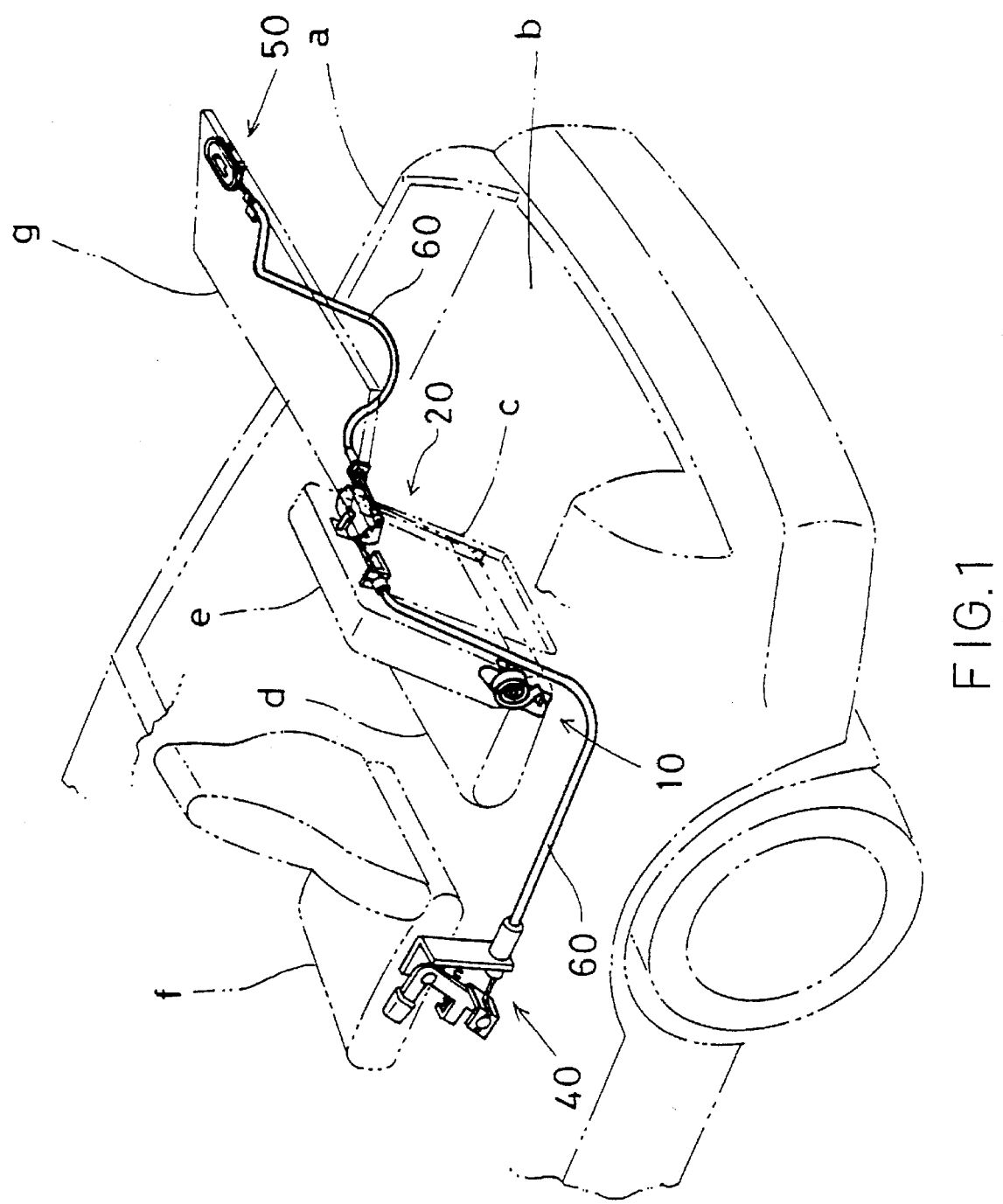
FIG. 1 is a perspective view schematically showing an embodiment of the invention.

Referring to FIG. 1, a designates a passenger car body having a partition serving to divide the car body a into a trunk space b normally closed by a lid g and a car room. Said partition is formed with an aperture c normally covered with a forward-collapsible back rest e of a backset d.

The backseat d is provided with biasing means 10 normally biasing the back rest e to collapse forward, the partition is provided above the aperture c with lock means 20 to hold the back rest e in its upright position, a front seat f is laterally provided with front seat side release means 40, and the lid g of the trunk space b is provided with trunk side release means 50. A control cable 60 extends between the front seat side release means 40 and the lock means 20 as well as between the lock means 20 and the trunk side release means 50.

Figure 2:
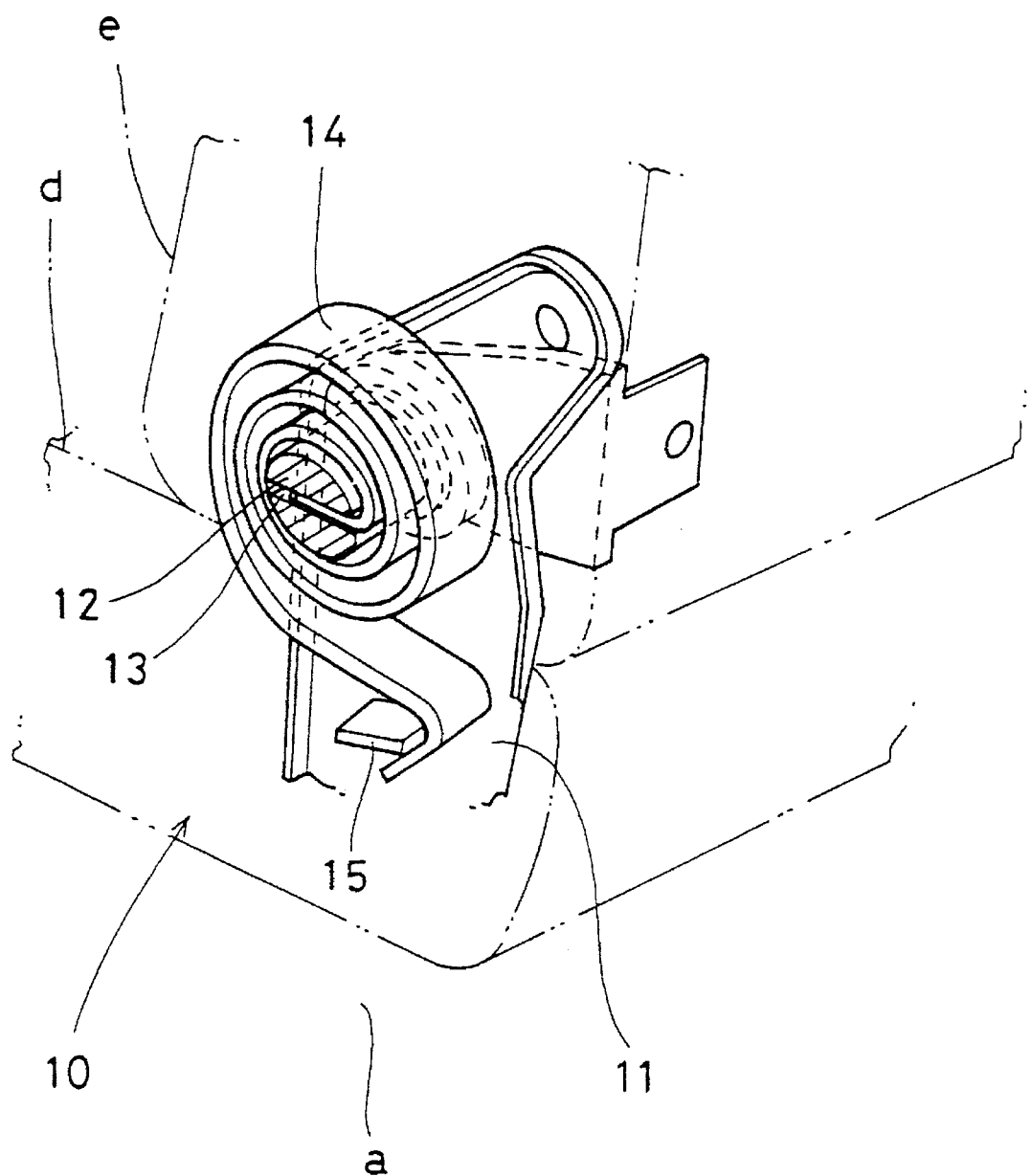
FIG. 2 is a perspective view showing biasing means normally biasing a back rest of backseat to collapse forward.

Referring to FIG. 2, the biasing means 10 comprises a bracket 11 vertically mounted on the car body 11, a rotary shaft 12 of the back rest e extending through said bracket 11, a split grove 13 formed in an end surface of said rotary shaft 12; and a spiral spring 14 having an inner end anchored in said split groove 13 and an outer end anchored on a pawl projecting from said bracket 11 so that the back rest e may be normally biased under a resiliency of this spiral spring 14 to collapse forward.

Figure 3:
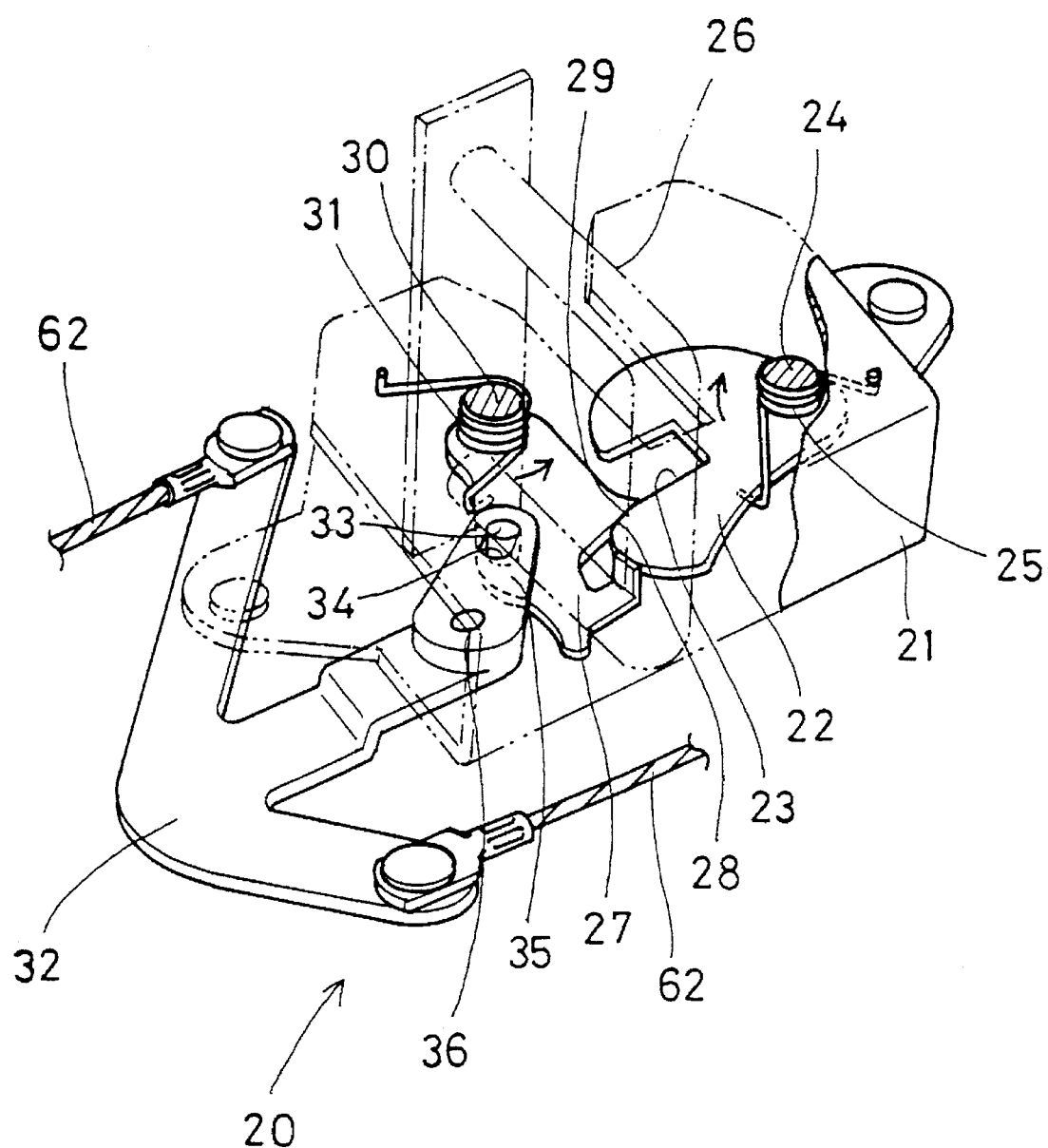
FIG. 3 is a perspective view of lock means.
Figure 4:
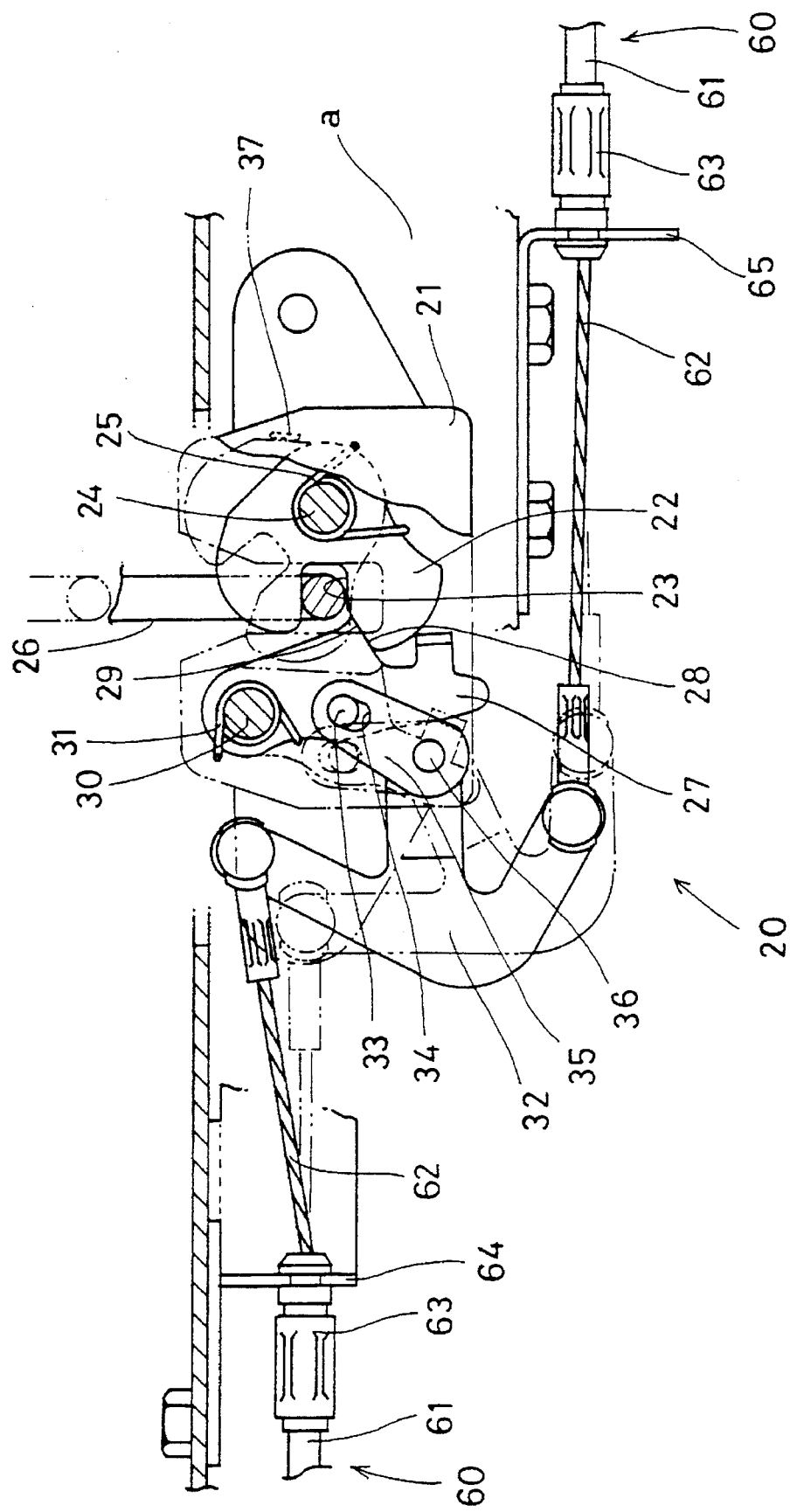
FIG. 4 is a plan view of lock means.

Referring now to FIGS. 3 and 4, the lock means comprises a box 21 fixed to the partition dividing the car body a into the trunk space b and the car room, a latch rod fixed to the back rest e of the back seat d on a rear surface adjacent its top, a holding lever 22 having a holding notch 23 adapted to receive said latch rod 26 and pivotally supported by a shaft 24 within said box 21, and a torsion coil spring 25 wound around said shaft 24 biasing said holding lever 22 to be clockwise rotated.

The box 21 further contains therein a latch lever 27 having a curved surface 28 destined to be engaged with a curved surface 29 which is continuous with said holding notch 23 and pivotally supported by a shaft 30 around which a torsion coil spring 31 is wound so that said latch lever 27 may be normally biased under a resiliency of said torsion spring 31 to be counterclockwise rotated.

Also within the box 21, a bell crank 32 integrally formed with an arm 35 having a slot 34 through which a pin 33 projects from the latch lever 27 is pivotally supported by a shaft 36.

Referring to FIG. 4, the car body a has brackets 64, 65 secured thereto, the one bracket 64 is fixedly provided with a cylindrical fixture 63 caulked on an end of an outer casing 61 for a control cable 60 extending from the front seat side release means 40 and the end of an inner cable 62 drawn from this cylindrical fixture 63 is connected to one end of the bell crank 32. The other bracket 65 is fixedly provided with a cylindrical fixture 63 caulked on the end of the control cable 60 extending from the trunk side release means 50 and the end of the inner cable 62 drawn from this cylindrical fixture 63 is connected to the other end of the bell crank 32.

Figure 5:
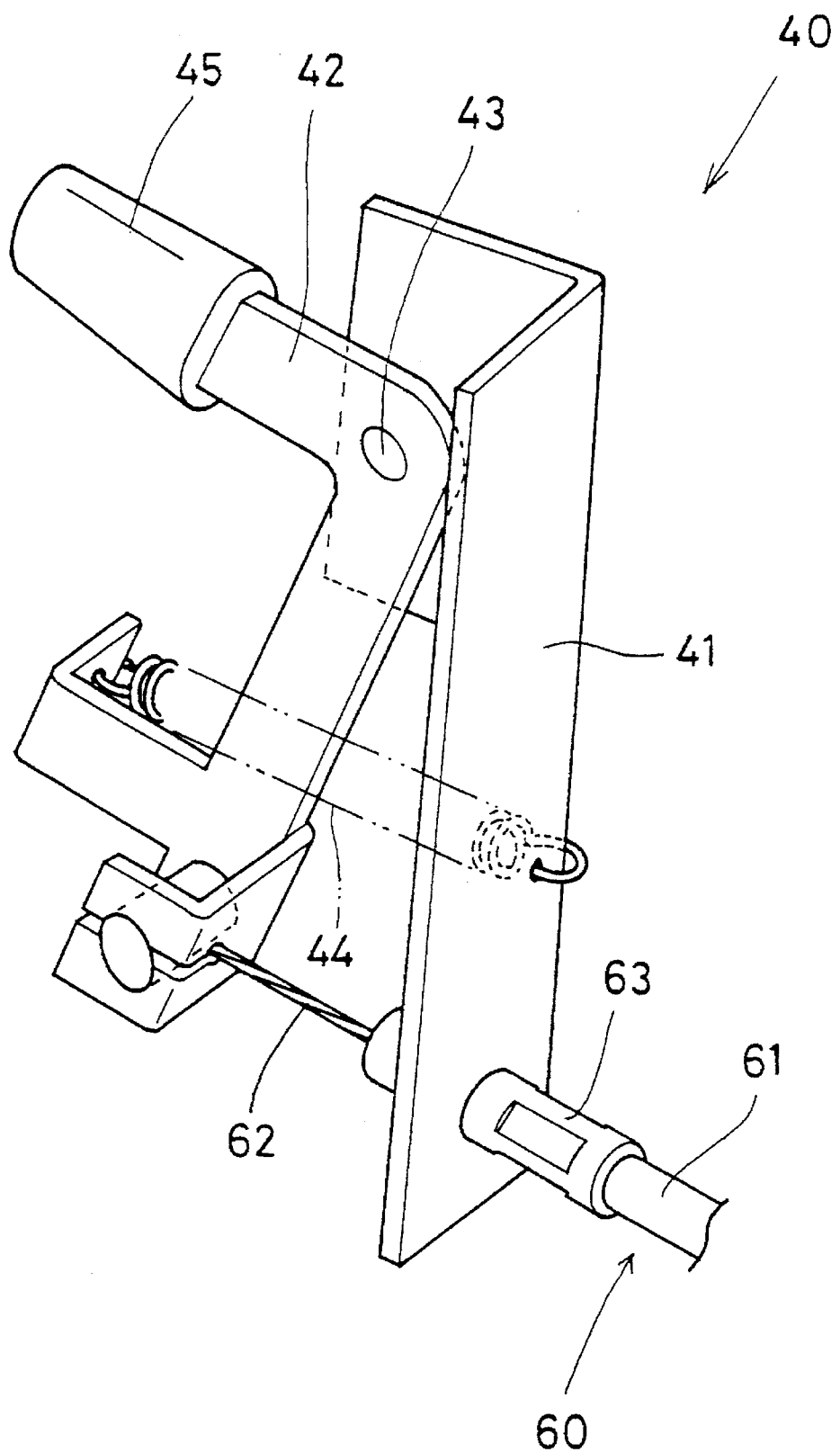
FIG. 5 is a perspective of front seat side release means.

Referring to FIG. 5 showing the front seat side release means 40, a lever 42 having a handle 45 is pivotally supported around a shaft 43 by a bracket 41 vertically mounted on the car body and normally biased under a resiliency of a tension coil spring 44 to be counterclockwise rotated. The bracket 41 is fixedly provided at its lower portion with the cylindrical fixture 63 caulked on the associated end of the outer casing 61 for the control cable 60 extending from the lock means 20 and the end of the inner cable 62 drawn from this cylindrical fixture 63 is connected to a lower end of said lever 42.

Figure 6:
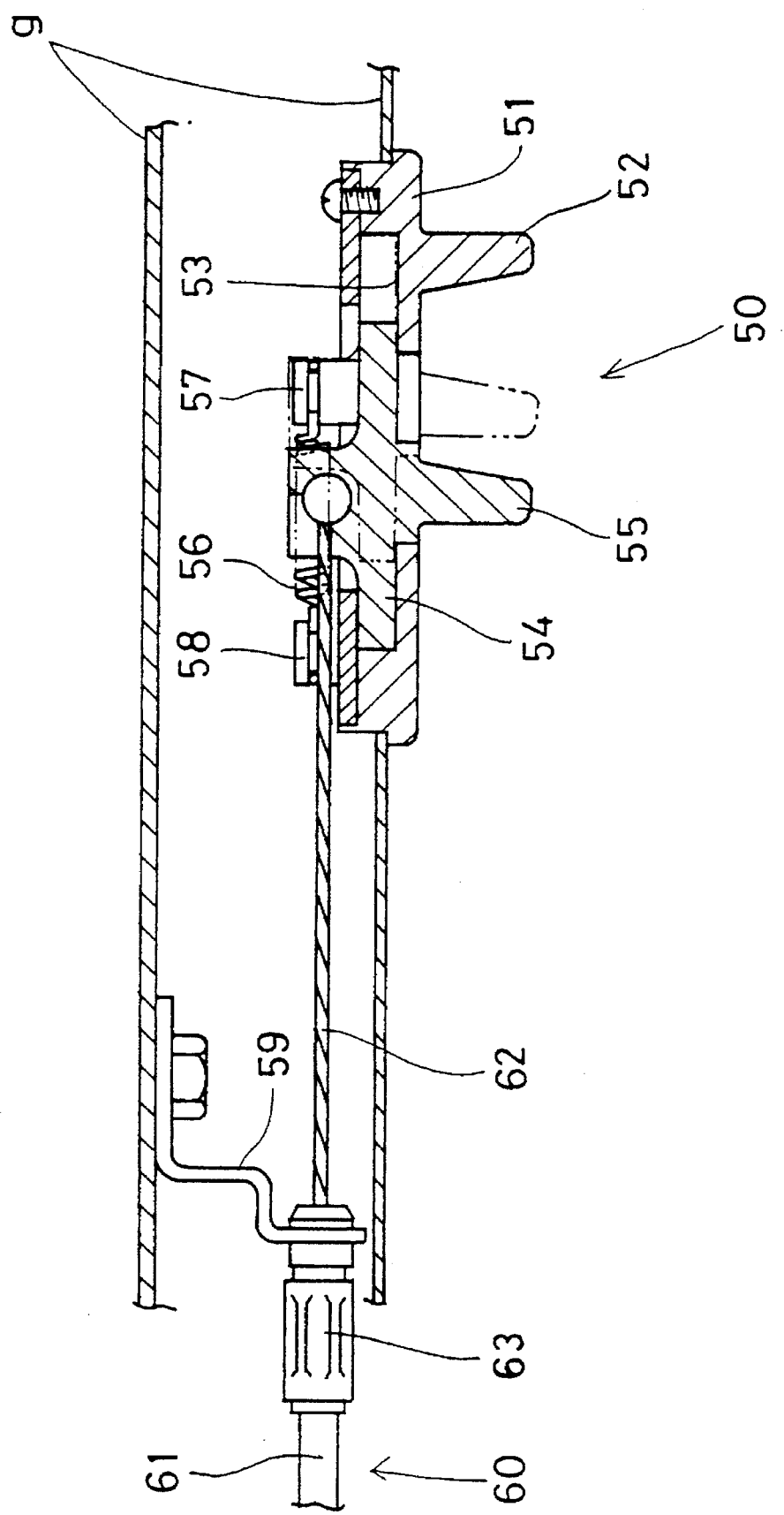
FIG. 6 is a sectional view of trunk side release means.

Referring to FIG. 6 showing the trunk side release means 50, a guide 51 having a guide groove 53 and a finger knob 52 is fixedly mounted on a rear side of the lid g for the trunk space b and said guide groove 53 slidably receive a slider 54 having a finger knob 55 projecting thereon so that the slider 54 may be biased under a resiliency of a tension coil spring 56 suspended between a pin 57 projecting on the slider 54 and a pin 58 projecting on the guide 51 to be moved leftward as viewed in FIG. 6.

Lid g has a bracket 59 fixed thereto, which is, in turn, fixedly provided with the cylindrical fixture 63 caulked on the associated end of the outer casing 61 for the control cable 60 extending from the lock means and the end of the inner cable 62 drawn from this cylindrical fixture 63 is connected to the slider 54.

The embodiment as has been described hereinabove operates as follows:

With the back rest e of the back seat d being in its erected position so as to cover the aperture c, as will be readily understood from FIG. 4, the latch rod 26 projecting from the back rest e is received by the holding notch 23 of the holding lever 22 and the holding lever 22 is biased under the resilient forces of the spiral spring 14 and the torsion coil spring 25 to be clockwise rotated. Against such biasing effect, the back rest e is held in its erected position, since the curved surface 29 which is continuous with said holding notch 23 is in engagement with the curved surface 28 of the latch lever 27 to prevent the holding lever 22 from being rotated.

For a person sitting on the front seat f, the lid g of the trunk space is opened by operating a trunk lid opener (not shown) and then the lever 42 of the front seat side release means 40 is erected with the handle 45 thereof in his or her hand so that the lever 42 may be rotated clockwise as viewed in FIG. 5 and the inner cable 62 of the cable 60 may be pulled thereby.

Thereupon, the bell crank 32 is counterclockwise rotated as indicated by two-dots-chain line in FIG. 5, whereby the pin 33 engages the slot 34 of the arm 35 to rotate the latch lever 27 clockwise. Consequently, the latch lever 27 is disengaged from the holding lever 22 which is, as a result, rotated clockwise and releases the latch rod 26 off from the holding notch 23. Thus the back rest e collapses forward, the aperture e is uncovered and the trunk space b communicates with the car room. In this state, the holding lever 22 is engaged with a stopper 37 and held in a position as indicated by two-dots-chain line in FIG. 4 and the latch lever 27 is engaged with the holding lever 22 since said latch lever 27 is biased under the resilient effect of the torsion coil spring 31 to be rotated counterclockwise.

For a person standing outside the car, the lid g of the trunk space b is opened by operating his or her key and the slider 54 is slidably moved rightward as indicated by two-dots-chain line in FIG. 6 with his or her fingers put on the finger knobs 52, 55 of the trunk side release means 50 so that the inner cable 62 of the control cable 60 may be pulled and the bell crank 32 of the lock means 20 may be counterclockwise rotated as indicated by two-dots-chain line in FIG. 4. In this manner, the back rest e collapses forward and the trunk space b communicates with the car room. Thus it can be seen that the pin 33 and the slot 34 function as lost motion means within the lock. This provides for alternative operation by the release means 40 and release means 60 to render holding of the latch rod by the release latch ineffective and release the latch rod to allow collapsing of the backrest forwardly.

As the back rest e is erected again, the latch rod 26 is received again by holding notch 23 of the holding lever 22 which is in the position as indicated by two-dots-chain line in FIG. 4 and thereby the holding lever 22 is counterclockwise rotated. Simultaneously the latch lever 27 is rotatably driven clockwise by the holding lever 22 and thereafter the latch lever 27 is counterclockwise rotated so that the mutual engagement of the curved surfaces 28, 29 may hold the holding lever 22 in the position as indicated by solid line in FIG. 4 and the back rest e may be held in its erected position.

While the invention has been described as arranged so that the locking effect by the lock means 20 can be removed selectively from the front seat side or from the trunk side, an alternative arrangement is also possible in which the lock means 20 can be released from only one of the front seat side and the trunk side.

The invention is applicable also to collapse the back rest e of the rear seat d to form a flat seat in various vehicles such as recreation vehicle, station wagon and hatchback vehicle.

I claim:

1. A device for collapsing a backrest of a backseat of a car comprising:

biasing means for biasing the backrest of said backseat to collapse forwardly;

lock means for holding the backrest in an upright position;

front seat side release means in the proximity of a front seat of the car and a trunk side release means in the proximity of a trunk space of the car for alternatively releasing the backrest from holding by said lock means thereby allowing said biasing means to effect collapsing forwardly of said backrest; and means for connecting one to another the lock means, the front seat release means and the trunk side release means comprising a control cable having a flexible outer casing and an inner cable slidable longitudinally therein extending from each of the front and trunk side release means and a bell crank mechanism connecting said control cable and the lock means.

2. A device for collapsing a backrest of a backseat of a car according to claim 1, in which said lock means comprises a latch rod fixed to said backrest, a releasable latch receptive of said latch rod when said backrest is positioned upright and releasably holding the backrest upright against a biasing force of said biasing means; and lost-motion means in said lock means operable alternatively by said release means to render holding of the latch rod by said releasable latch ineffective and release said latch rod.

* * * * *